US008393238B2

United States Patent
Gumpoltsberger et al.

(10) Patent No.: US 8,393,238 B2
(45) Date of Patent: *Mar. 12, 2013

(54) DUAL CLUTCH TRANSMISSION

(75) Inventors: Gerhard Gumpoltsberger, Friedrichshafen (DE); Juergen Wafzig, Eriskirch (DE); Matthias Reisch, Ravensburg (DE); Wolfgang Rieger, Friedrichshafen (DE); Ralf Dreibholz, Meckenbeuren (DE); Markus Maier, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 333 days.

This patent is subject to a terminal disclaimer.

(21) Appl. No.: 12/681,922

(22) PCT Filed: Oct. 8, 2008

(86) PCT No.: PCT/EP2008/063428
§ 371 (c)(1),
(2), (4) Date: Apr. 7, 2010

(87) PCT Pub. No.: WO2009/050076
PCT Pub. Date: Apr. 23, 2009

(65) Prior Publication Data
US 2010/0206107 A1 Aug. 19, 2010

(30) Foreign Application Priority Data

Oct. 15, 2007 (DE) .......................... 10 2007 049 271

(51) Int. Cl.
*F16H 3/08* (2006.01)
(52) U.S. Cl. ........................................................ 74/330

(58) Field of Classification Search .................... 74/330, 74/333, 340
See application file for complete search history.

(56) References Cited

U.S. PATENT DOCUMENTS

| 6,244,123 | B1 | 6/2001 | Hegerath et al. | |
| 6,869,379 | B2* | 3/2005 | Voss et al. | 475/218 |
| 7,066,043 | B2* | 6/2006 | Kim et al. | 74/330 |
| 7,225,696 | B2* | 6/2007 | Gitt | 74/340 |
| 7,246,536 | B2 | 7/2007 | Baldwin | |
| 7,287,442 | B2 | 10/2007 | Gumpoltsberger | |
| 7,597,644 | B2* | 10/2009 | Rodgers, II | 475/218 |
| 7,604,561 | B2* | 10/2009 | Earhart | 475/218 |

(Continued)

FOREIGN PATENT DOCUMENTS

| DE | 38 22 330 A1 | 7/1989 |
| DE | 102 39 540 A1 | 3/2004 |

(Continued)

OTHER PUBLICATIONS

Prof. Dr. P. Tenberge; "Doppelkupplungsgetriebe in Planetenradbauweise Getriebestrukturen zwischen Automatik- und Doppelkupplungsgetrieben" Wissenportal baumaschine de 3 2007.

*Primary Examiner* — Ha D. Ho
(74) *Attorney, Agent, or Firm* — Davis & Bujold, PLLC

(57) ABSTRACT

A double clutch transmission with two clutches connected to a drive shaft and to one of two transmission input shafts. Fixed gears are coupled to the input shafts and engage idler gears. Several coupling devices connect the idler gears to a respective countershaft which have an output gear that couple gears of an output shaft such that forward and reverse gears can be shifted. Three dual gear planes each comprise two idler gears, each supported by a respective countershaft, and one fixed gear. In each dual gear plane, at least one idler gear wheel can be used for implementing at least two gears so that at least one winding-path gear can be shifted via a shifting device.

14 Claims, 4 Drawing Sheets

U.S. PATENT DOCUMENTS

| | | |
|---|---|---|
| 7,604,565 B2 * | 10/2009 | Lee et al. .......................... 477/3 |
| 8,051,732 B2 * | 11/2011 | Gitt ................................. 74/331 |
| 2006/0054441 A1 | 3/2006 | Ruedle |
| 2009/0036247 A1 * | 2/2009 | Earhart et al. ................. 475/35 |

FOREIGN PATENT DOCUMENTS

| | | |
|---|---|---|
| DE | 103 05 241 A1 | 9/2004 |
| DE | 10 2004 001 961 A1 | 8/2005 |
| DE | 10 2004 012 909 A1 | 10/2005 |
| DE | 10 2005 028 532 A1 | 12/2006 |
| DE | 10 2005 045 005 A1 | 3/2007 |
| FR | 2 880 088 A1 | 6/2006 |
| GB | 2 424 250 A | 9/2006 |
| WO | 2005/068875 A3 | 7/2005 |
| WO | 2005/093289 A1 | 10/2005 |

* cited by examiner

| G | ZS | K1 | K2 | A | B | C | D | E | F | I | K | S_ab1 |
|---|---|---|---|---|---|---|---|---|---|---|---|---|
| G1 | i_3·i_4·i_2 |  | 1 |  |  | 1 |  |  |  |  | 1 | 1 |
| G2 | i_2 | 1 |  |  |  | 1 |  |  |  |  |  | 1 |
| G3 | i_3 |  | 1 |  |  |  | 1 |  |  |  |  | 1 |
| G4 | i_4 | 1 |  |  |  |  |  | 1 |  |  |  | 1 |
| G5 | i_5 |  | 1 |  | 1 |  |  |  |  |  |  | 1 |
| G6 | i_6 | 1 |  |  | 1 |  |  |  |  |  |  | 1 |
| G7 | i_4·i_3·i_5 | 1 |  | 1 |  |  |  |  |  |  |  | 1 |
| R-GEAR | | | | | | | | | | | | |
| R1 | i_R | 1 |  |  |  |  |  |  | 1 |  |  | 1 |
| R2 | i_5·i_6·i_R |  | 1 |  |  |  |  |  | 1 | 1 |  | 1 |
| R3 | i_3·i_4·i_R |  | 1 |  |  |  |  |  | 1 | 1 | 1 | 1 |
| LOW SPEED GEAR | | | | | | | | | | | | |
| C1 | i_2·i_5·i_3 | 1 |  | 1 |  | 1 | 1 |  |  |  |  |  |
| OVERDRIVE GEAR | | | | | | | | | | | | |
| O1 | i_5·i_2·i_4 |  | 1 | 1 |  | 1 |  | 1 |  |  |  |  |

Fig. 2

| G | ZS | K1 | K2 | A | B | C | D | E | F | I | K | S_ab1 |
|---|---|---|---|---|---|---|---|---|---|---|---|---|
| G1 | i_5·i_6·i_2 |  |  |  |  | 1 |  |  |  | 1 |  | 1 |
| G2 | i_2 | 1 |  |  |  | 1 |  |  |  |  |  | 1 |
| G3 | i_3 |  | 1 |  |  |  | 1 |  |  |  |  | 1 |
| G4 | i_4 | 1 |  |  |  |  |  | 1 |  |  |  | 1 |
| G5 | i_5 |  | 1 | 1 |  |  |  |  |  |  |  | 1 |
| G6 | i_6 | 1 |  |  | 1 |  |  |  |  |  |  | 1 |
| G7 | i_4·i_3·i_5 | 1 | 1 | 1 |  |  |  |  |  |  | 1 | 1 |
| R-GEAR |  |  |  |  |  |  |  |  |  |  |  |  |
| R1 | i_R | 1 |  |  |  |  |  |  | 1 |  |  | 1 |
| R2 | i_5·i_6·i_R |  | 1 |  |  |  |  |  | 1 | 1 |  | 1 |
| R3 | i_3·i_4·i_R |  | 1 |  |  |  |  |  | 1 |  | 1 | 1 |
| LOW SPEED GEAR |  |  |  |  |  |  |  |  |  |  |  |  |
| C1 | i_2·i_5·i_3 | 1 | 1 | 1 |  | 1 | 1 |  |  |  |  |  |
| OVERDRIVE GEAR |  |  |  |  |  |  |  |  |  |  |  |  |
| O1 | i_5·i_2·i_4 |  | 1 | 1 |  | 1 |  | 1 |  |  |  |  |

Fig. 4

DUAL CLUTCH TRANSMISSION

This application is a National Stage completion of PCT/EP2008/063428 filed Oct. 8, 2008, which claims priority from German patent application serial no. 10 2007 049 271.7 filed Oct. 15, 2007.

FIELD OF THE INVENTION

The present invention relates to a dual clutch transmission for a motor vehicle.

BACKGROUND OF THE INVENTION

Known from the publication DE 103 05 241 A1 is a 6-speed or 7-speed dual clutch transmission. The dual clutch transmission comprises two clutches, each being connected with their inputs to the drive shaft and with an output to one of the two transmission input shafts. The two transmission input shafts are coaxially positioned with respect to each other. In addition, two countershafts are positioned to be axially parallel to the transmission input shafts, their idle gears mesh with the fixed gear wheels of the transmission input shafts. Furthermore, coupling devices that are axially movable, are connected in a rotationally fixed manner to the countershaft to shift the respective gear wheels. Each selected ratio is transferred by the drive gear wheels to a differential transmission. To achieve the desired gear ratio steps in this known dual clutch transmission, a vast number of gear wheel planes are required, so that a significant amount of installation space is needed.

In addition, a spur gear change speed transmission is known from the publication DE 38 22 330 A1. The spur gear change speed transmission comprises a dual clutch, that is shiftable under power, and where one part is connected with a drive shaft and the other part with a hollow drive shaft that is positioned rotatably on the drive shaft. For certain gear ratios, the drive shaft can be coupled with the hollow drive shaft through a shifting device.

Known from the publication DE 10 2004 001 961 A1 is a power transmission with two clutches, each of which are assigned to a partial transmission. The transmission input shafts of the two partial transmissions are positioned coaxially with respect to each other and mesh, via fixed gear wheels, with idle gears of the designated countershaft. The respective idle gears of the countershafts can be connected, in a rotationally fixed manner, with the respective countershaft by designated shifting devices. The particular idle wheels of the countershaft can be connected in a rotationally fixed manner through the assigned shifting devices with the associated countershaft. A 7-gear transmission, among other things, is known through this publication in which an additional shift element is provided to connect the two transmissions input shafts to establish an additional transmission stage. The 7-gear transmission requires in this embodiment at least six gear wheel planes in the two partial transmissions, to achieve the transmission stages. This causes an unwanted extension of the construction length in axial direction. It is therefore significantly limiting the use in a motor vehicle.

SUMMARY OF THE INVENTION

It is the task of the present invention to propose a dual clutch transmission based on the previously described genus, in which power engaging gear ratio steps can be realized, possibly cost-efficient and with just a few parts, which need little installation space.

Thus, a dual clutch transmission with two clutches, optimized for needed installation space, is proposed, in which the inputs are connected with a drive shaft and the outputs are each connected with one of two, for instance coaxial to each other, transmission input shafts. The dual clutch transmission comprises at least two countershafts, on which gear wheels, designed as idle gears, are rotatable positioned, and on the two transmissions input shafts are gear wheels connected, in a rotationally fixed manner and designed as fixed wheels, which at least partially mesh with the idle gears. In addition, several coupling devices are provided for connection of an idler gear wheel with a countershaft in a rotationally fixed manner. The dual clutch transmission, in accordance with the invention, has one output gear wheel each respectively, at the two countershafts, each of which are coupled with gears of a drive shaft, to connect the respective countershaft with the output, and has at least an activated or engaging shifting device as a so-called winding-path shifting device for a rotationally fixed connection of two gear wheels, whereby several power shiftable forward gears and at least one reverse gear can be shifted.

In accordance with the invention, just three dual gear wheel planes are preferably provided, in which an idler gear wheel on the countershaft is assigned to a fixed gear wheel of a transmission input shaft, whereby in each dual gear wheel plane at least one idler gear wheel can be used for at least two gears, so that at least a winding-path gear can be shifted via at least one shifting device. Due to the possible multi-use of idle gears, the proposed dual clutch transmission enables a maximum number of gear ratios with as few gear wheel planes as possible and all forward gears and all reverse gears being power engaging in sequential execution.

The inventive dual clutch transmission can preferably be designed as a 7-gear transmission. Due to the shortened installation space requirement, as compared to known transmission configurations, the inventive dual clutch transmission is especially applicable in a front-transverse construction. However, other constructions are also possible, and are depending on the design and the available installation space of the respective motor vehicle.

Within the scope of a first, possible embodiment, it is provided via a first shifting device on the second countershaft, that an idler gear wheel of the second partial transmission can be connected with an idler gear wheel on the first partial transmission, whereby, via the first shifting device, at least the first forward gear, the seventh forward gear and a reverse gear can be shifted as winding-path gears. Thus, the first forward gear and the seventh forward gear can be realized as winding-path gears via the gear steps of the third forward gear and the fourth forward gear. Because of the use of just one shifting device as a winding-path gear shifting device, only three shifting coupling devices, respectively are needed on the first countershaft.

A second embodiment of the invention can provide, that via the first shifting device the seventh gear and a reverse gear can be shifted as a winding-path gear, whereby the second shifting device, on the first countershaft, an idler gear wheel of the second partial transmission can be connected with an idler gear wheel of the first partial transmission, so that via the second shifting device at least a first forward gear and an additional reverse gear can be shifted as a winding-path gear. Contrary to the previously described first embodiment, two shifting devices are now used for the winding-path gears, whereby more freedom arises in regard to adjustment of the gear ratio. Also an alternative reverse gear can be realized in the second embodiment.

The inventive dual clutch transmission allows, via at least one shifting device, to realize winding-path gears, where the gear wheels of both partial transmissions are coupled with each other, to realize a flow of force through both partial transmissions. The respectively used shifting devices serve as the coupling of two idle gears and therefore creates a dependency of the transmission input shafts on each other.

The positioning of the shifting devices to connect two defined idle gears, independently of each embodiment of the dual clutch transmission, can vary, so that the shifting devices do not have to be necessarily positioned between the idle gears which have to be connected. Thus, other positioning designs of each shifting device are conceivable, for instance to optimize the connectage to an actuating device.

The dual clutch transmission can, in accordance with a possible embodiment, provide that the first dual gear wheel plane comprises a fixed gear wheel on the second transmission input shaft of the second partial transmission, and the second and the third dual gear wheel plane comprises two fixed gear wheels on the first transmission input shaft of the first partial transmission. Hereby and independent of the respective embodiment, each of the three fixed gear wheels of the transmission input shaft can be used for at least two gear ratios. For the forward gear ratios just three idler gear wheels, in an advantageous way, are needed on a countershaft and which mesh with the fixed gear wheels of the transmission input shafts, and just two idler gear wheels are needed on the other countershaft, which also mesh with the fixed gear wheels of the transmission input shafts.

To realize the reverse gears in the inventive dual clutch transmission, an intermediate gear can be used which, for instance, is positioned on an intermediate shaft. It is also possible that one of the idle gears on a countershaft serves as intermediate gear wheel for at least one reverse gear. In this case, no additional intermediate shaft is necessary for the reverse gearing, because one of the idle gears meshes with a fixed gear wheel as well as with an additional, shiftable idler gear wheel on the countershaft. Hence, the required intermediate gear for the realization of the reverse gear is positioned as a shiftable idler gear wheel on a countershaft, and also serves for the realization of at least one additional forward gear. The intermediate gear wheel can always be designed as a step gear, regardless of whether it is positioned on a countershaft or on an additional intermediate shaft.

To obtain the desired transmission gear steps, it can be provided in this inventive dual clutch transmission that, on each countershaft at least one dual action coupling device is established. The provided coupling devices can, in the activated or engaged condition, and depending on the direction of operation, connect an assigned idler gear wheel in a rotationally fixed manner with the countershaft. In addition, a single action coupling device can be established on at least one countershaft as a shifting location. Clutches, operating on a hydraulic, electric, pneumatic, or mechanical basis, or also interlocking claw clutches, as well as any kind of synchronization devices can be applied, and connect an idler gear wheel in a rotationally fixed manner with a countershaft. It is also possible that a single action coupling device is replaced by two single action coupling devices, and vice versa.

It is possible that the mentioned options for positioning of the gear wheels vary, and also the number of gear wheels and the number of coupling devices are altered to realize additional power engaging and non-power engaging gears, for further reduction of installation space and component cost for this inventive dual clutch transmission. Especially fixed wheels of dual gear wheel planes can be split into two fixed wheels for two single gear wheel planes. Hereby, the stepping can be improved. It is also possible, to swap the countershafts. The partial transmissions can also be swapped, in a mirror image around a vertical axle. Hereby, the hollow shaft and the solid shaft are swapped. It is possible to position the smallest gear wheel on the solid shaft, to further optimize the use of the available installation space. In addition, neighboring gear wheel planes can be swapped, to optimize deflection of the shaft and/or to optimize connecting of a shifting actuator device. Also, the respective mounting position of the coupling devices on the gear wheel plane can be varied. In addition, the direction of actuation of the coupling devices can be varied.

The gear numbering used herein is freely defined. It is also possible to add a low speed gear, to improve the off road characteristics of the acceleration performance of a motor vehicle. In addition, the first gear can be left out, for instance, to better optimize the entirety of the gear steps. The numbering of the gears varies through these measures accordingly.

Independent of the respective variations of the embodiments of the dual clutch transmission, the drive shaft and the output shaft can be positioned at an angle with respect to each other, which enables an especially space saving configuration. For instance, the shafts which are spatially positioned one after another, can also be slightly offset to each other. In that configuration, a direct gear with a transmission ratio of one can be realized by teeth engaging and can be shifted, relatively freely, to the fourth, fifth, or sixth gear. Different configurations of the drive shaft and the output shaft is also possible.

The proposed dual clutch transmission is provided, preferably, with an integrated output stage. The output stage can comprise, as output gear wheel, a fixed gear wheel on the output shaft, which meshes with a first output gear wheel, designed as fixed gear wheel, on the first countershaft, as well as with a second output gear wheel, designed as fixed gear wheel, on the second countershaft. However, it is possible that one of the output gear wheels is designed as a shiftable gear wheel.

Advantageously, the lower forward gears and the reverse gears can be activated through a starting or shifting clutch to hereby focus higher loads to this clutch and to construct the second clutch with to have a lower need for installation space and more cost-effectively. Especially, the gear wheel planes in the proposed dual clutch transmission can be positioned in a way that one can start, by way of the inner transmission input shaft or the outer transmission input shaft, such that starting can be accomplished by the more appropriate clutch, which may have a concentrically positioned, radially nested construction of the dual clutch. Hereby and accordingly, the gear wheel planes can be positioned as mirror-symmetric, or swapped, respectively. It is also possible that the countershafts are swapped or positioned in a mirror image.

Independent of the respective embodiments, for instance, the provided gear wheel planes of the dual clutch transmission can be swapped. It is also possible, to use instead of a dual gear wheel plane, two single gear wheel planes and/or vice versa. In addition, the two partial transmissions can be oppositely positioned.

BRIEF DESCRIPTION OF THE DRAWINGS

Following, the present invention is further explained based on the drawings. It shows:

FIG. 2 a shift scheme of the first embodiment in accordance with FIG. 1;

FIG. 4 a shift scheme of the second embodiment in accordance with FIG. 3.

DETAILED DESCRIPTION OF THE PREFERRED EMBODIMENTS

Figure 1:
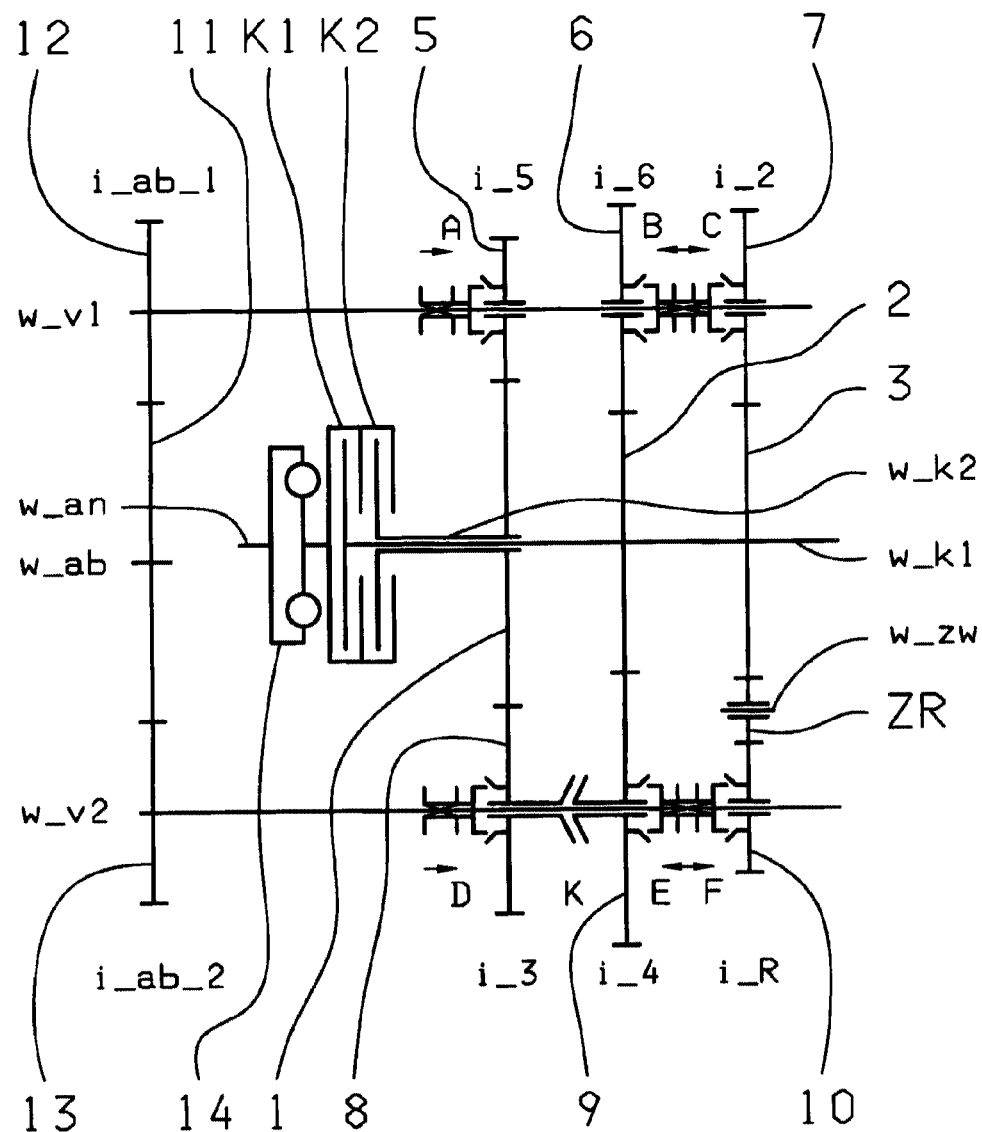
FIG. 1 a schematic view of a first embodiment of an inventive 7-gear dual clutch transmission.
Figure 3:
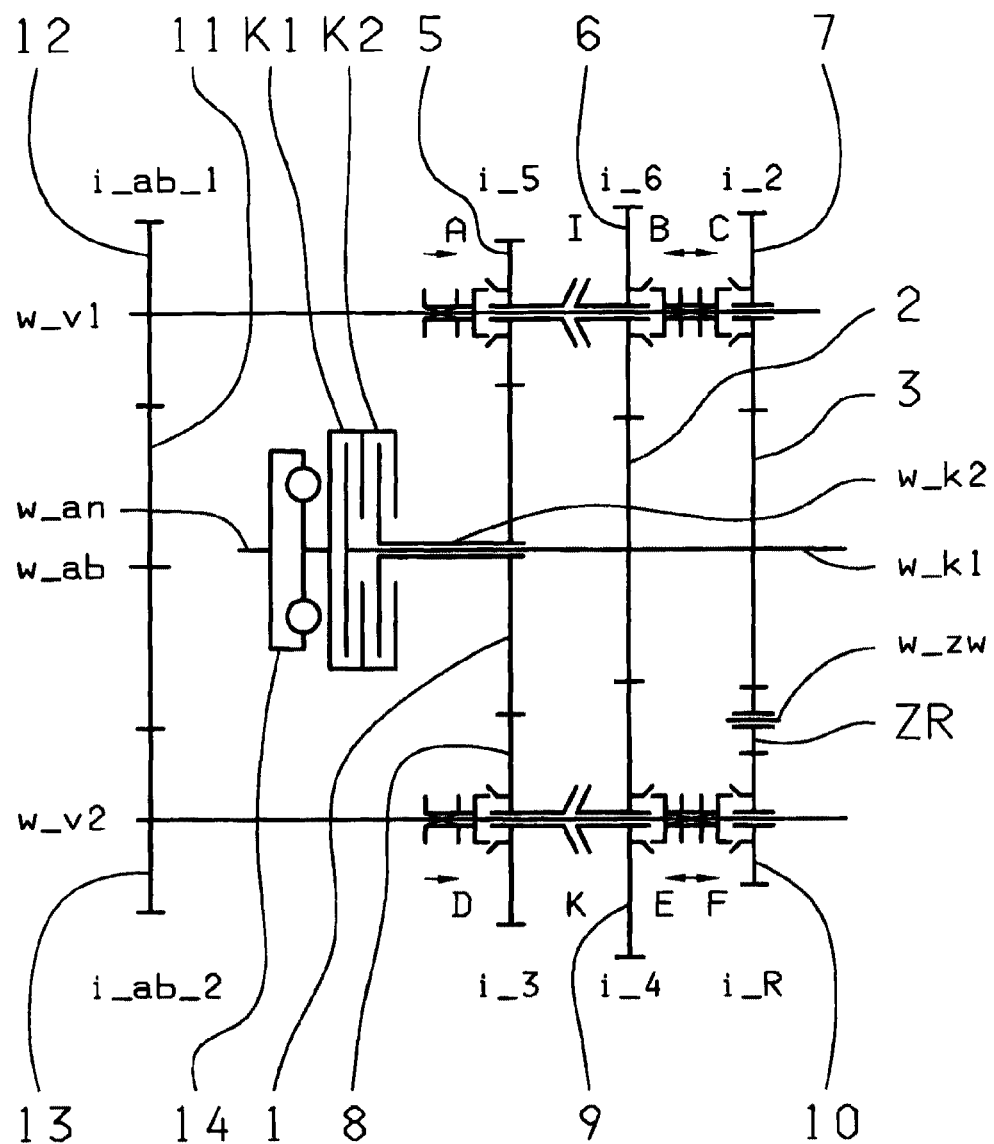
FIG. 3 a schematic view of a second embodiment of the inventive 7-gear dual clutch transmission.

FIGS. 1 and 3 each show a possible embodiment of a 7-gear dual clutch transmission. The respective shifting schemes of the embodiments are presented in the tables of FIGS. 2 and 4.

The 7-gear dual clutch transmission comprises two clutches K1, K2, where their input sides are connected to a drive shaft w_an and their output sides are each connected to one of two, coaxially arranged transmission input shafts w_K1, w_K2. Also, a torsional vibration damper 14 can be positioned on the drive shaft w_an. In addition, two countershafts w_v1, w_v2 are provided, on which gear wheels are rotatably supported and designed as idle gears 5, 6, 7, 8, 9, 10. Both transmission input shafts w_K1, w_K2 have gear wheels that are connected thereto in a rotationally fixed manner and designed as fixed gear wheels 1, 2, 3, which at least partially mesh with the idle gears 5, 6, 7, 8, 9, 10.

To connect the idle gears 5, 6, 7, 8, 9, 10 to the respective countershafts w_v1, w_v2, several activating coupling devices A, B, C, D, E, F are provided on the countershaft w_v1, w_v2. Output gear wheels 12, 13 are also positioned on both countershafts w_v1, w_v2 and designed as constant pinions, and each of which are coupled with the gearing of an output shaft w_ab.

Beside the coupling devices A, B, C, D, E, F, which connect a gear wheel and the assigned countershaft w_v1, w_v2 in a rotationally fixed manner, at least one winding-path shifting device K, I is provided to connect two gear wheels on a countershaft w_v1, w_v2, in a rotationally fixed manner to realize at least one winding-path gear.

Independent of the embodiments, the shifting device K is positioned between the first dual gear wheel plane 5-8 and the second dual gear wheel plane 6-9 on the second countershaft w_v2, to connect the idler gear wheel 8 with the idler gear wheel 9. In a second embodiment, in accordance with FIG. 3, an additional, second shifting device I is positioned on the first countershaft w_v1 between the first dual gear wheel plane 5-8 and the second dual gear wheel plane 6-9, to connect the idler gear wheel 5 with the idler gear wheel 6.

In the inventive dual clutch transmission, just three dual gear wheel planes 5-8, 6-9, 7-10 are provided, and in each case an idler gear wheel 5, 8, 6, 9, 7, 10 on the countershaft w_v1 is assigned to a fixed gear wheel 1, 2, 3 on the transmission input shafts w_K1, w_K2, in each dual gear wheel plane 5-8, 6-9, 7-10, at least one idler gear wheel 5, 6, 7, 8, 9, 10 can be used for at least two gears steps, so that the winding-path gears can be shifted at least via one shifting device K, I. A claw can be used as a shifting device K, I can be used for connecting two gear wheels.

In both embodiments, in accordance with FIGS. 1 and 3, the three dual gear wheel planes 5-8, 6-9, 7-10 comprise two fixed gear wheels 2, 3 on the first transmission input shaft w_K1 and a fixed gear wheel 1 on the second transmission input shaft w_K2, and three idle gears 5, 6, 7, 8, 9, 10 on the two countershafts w_v1, w_v2.

In the first dual gear wheel plane 5-8, the fixed gear wheel 1 of the second transmission input shaft w_K2 meshes with the idler gear wheel 5 on the first countershaft w_v1, as well as with the idler gear wheel 8 on the second countershaft w_v2. In the second dual gear wheel plane 6-9, the fixed gear wheel 2 of the first transmission input shaft w_K1 meshes with the idler gear wheel 6 on the first countershaft w_v1, as well as with the idler gear wheel 9 on the second countershaft w_v2. Finally, in the third dual gear wheel plane 7-10, the fixed gear wheel 3 on the first transmission input shaft w_K1 meshes with the idler gear wheel 7 on the first countershaft w_v1, as well as with an intermediate gear wheel ZR, whereby the intermediate gear wheel ZR enables reversal of rotation to realize a reverse gear R1, R2, R3. The intermediate gear wheel ZR is rotatably positioned on the intermediate shaft w_zw, in this example, in parallel to the countershafts w_v1, w_v2. The intermediate gear wheel ZR also meshes with the idler gear wheel 10 on the second countershaft w_v2.

On each countershaft w_v1, w_v2, in this example, a dual action coupling device B, C; E, F is positioned between the second dual gear wheel plane 6-9 and the third dual gear wheel plane 7-10, in addition to each dual action coupling device B, C; E, F two single action coupling devices can be provided. The idler gear wheel 6 can be connected, via the coupling device B, to the first countershaft w_v1, and the idler gear wheel 7 can be connected, via the coupling device C, to the first countershaft w_v1. The idler gear wheel 9 can be connected, via the coupling device E, to the second countershaft w_v2, and the idler gear wheel 10 can be connected, via the coupling device F, to the second countershaft w_v2.

A single action coupling device A, for instance, is arranged in the first dual gear wheel plane 5-8, to connect the idler gear wheel 5 with the first countershaft w_v1. Also, a single action coupling device D is arranged in the first dual gear wheel plane 5-8, to connect the idler gear wheel 8 with the second countershaft w_v2.

In the inventive dual clutch transmission, an integrated output step is provided by way of the output gear wheel 12 which is connected in a rotationally fixed manner with the first countershaft w_v1, and the output gear wheel 13, which is connected in a rotationally fixed manner with the second countershaft w_v2. The output gear wheel 12 and the output gear wheel 13 each mesh with a fixed gear wheel 11 on the output shaft w_ab.

Independent of the respective embodiment, the gear wheel steps i_4 and i_6 of the power shiftable forward gears G4 and G6 are located in one gear wheel plane, designed as dual gear wheel plane 6-9. Also, the gear wheel steps i_2 and i_R of the power shiftable second forward gear G2 and of a reverse gear R are located in one gear wheel plane, designed as dual gear wheel plane 7-10. Furthermore, the gear wheel steps i_3 and i_5 of the power shiftable forward gears G3 and G5 are located in one gear wheel plane, designed as dual gear wheel plane 5-8. In the inventive dual clutch transmission, the first and highest forward gear, and one reverse gear, are winding-path gears. Also, the first power shiftable forward gear is a winding-path gear.

The presented table in FIG. 2 shows an exemplary shifting scheme on the first embodiment of the 7-dear dual clutch transmission.

From the shifting scheme can be seen, that the first forward gear G1 can be shifted via the second clutch K2 and via the activated shifting device K, as well as via the activated coupling device C as a winding-path gear, that the second forward gear G2 can be shifted via the first clutch K1 and via the activated coupling device C, that the third forward gear G3 can be shifted via the second clutch K2 and via the coupling device D, that the fourth forward gear G4 can be shifted via the first clutch K1 and via the activated coupling device E, that the fifth forward gear G5 can be shifted via the second clutch K2 and via the coupling device A, that the sixth forward gear G6 can be shifted via the first clutch K1 and via the activated coupling device B, and that the seventh forward gear G7 can be shifted via the first clutch K1 and via the activated shifting device K, as well as a winding-path gear via the coupling device A.

It can be seen from the shifting scheme in regard to possible reverse gear ratios, in accordance with FIG. 2, that a reverse gear R1 can be shifted via the first clutch K1 and via the activated coupling device F, and that another reverse gear R3 can be shifted via the second clutch K2 and via the activated shifting device K, as well as via the activated coupling device F as a winding-path gear. It is possible that an additional reverse gear R2 can be shifted via the second clutch K2 and via an additional activated shifting device I, as well as via the activated coupling device F as a winding-path gear in the first embodiment.

From the shifting scheme, in accordance with FIG. 2, it can be seen in particular that in the first forward gear G1, starting from the second clutch K2, the gear wheel steps i_3, i_4, and i_2 are used, whereby the two partial transmissions are coupled via the shifting device K. In the second forward gear G2, just a gear wheel step i_2 is used, in the third forward gear G3, the gear wheel step i_3, and the fourth forward gear G4, the gear wheel step i_4, in the fifth forward gear G5, the gear wheel step i_5, and in the sixth forward gear G6, the gear wheel step i_6 is used. In the seventh forward gear G7, the gear wheel steps i_4, i_3, and i_5 are applied and the two partial transmissions are again coupled with each other via the shifting device K. In the reverse gear R1, only the gear wheels step i_R in the third dual gear wheel plane 7-10 is used, whereby the additional, possible reverse gear R2, as a winding-path gear, uses the gear wheel steps i_5, i_6, and i_R, to couple the two partial transmissions via the shifting device I. The next, possible reverse gear R3 uses the gear wheel steps i_3, i_4, and i_R, and couples the two partial transmissions via the shifting device K.

The presented table in FIG. 4 shows exemplary the shifting scheme for the second embodiment of the 7-gear dual clutch transmission.

From the shifting scheme can be seen, that the first forward gear G1 can be shifted via the second clutch K2, via the activated shifting device I, and via the activated coupling device C as a winding-path gear, that the second forward gear G2 can be shifted via the first clutch K1 and via the activated coupling device C, that the third forward gear G3 can be shifted via the second clutch K2 and via the activated coupling device D, that the fourth forward gear G4 can be shifted via the first clutch K1 and via the activated coupling device E, that the fifth forward gear G5 can be shifted via the second clutch K2 and via the activated coupling device A, that the sixth forward gear G6 can be shifted via the first clutch K1 and via the activated coupling device B, and that the seventh forward gear G7 can be shifted via the of first clutch K1, via the activated shifting device K, and via the activated coupling device A as a winding-path gear.

In regard to the possible reverse gear ratios, the same shifting scheme applies as in the embodiment in accordance with FIG. 1.

In the embodiments, in accordance with FIGS. 1 and 3, a low speed gear C1 (Crawler) can be shifted via an additional coupling device S_ab1, assigned to the output gear wheel 12, which is, because of simplicity, not shown in the FIGS. 1 to 3, and via the first clutch K1, via the activated coupling device C, via the activated coupling device A, when the coupling device S_ab1 is not engaged, and via the activated coupling device D as a winding-path gear. It can be seen in particular, that in the low speed gear C1, starting from the first clutch K1, the gear wheel steps i_2, i_5, and i_3 are used.

Furthermore, an additional coupling device S_ab1, assigned to the output gear wheel 12 and as a winding-path shifting device, an overdrive gear O1 (Overdrive 1) can be shifted via the second clutch K2, via the activated coupling device A, via the activated coupling device C, and when the coupling device S_ab1 is non-engaged and the coupling device E is engaged, as a winding-path gear. In particular it can be seen that, in the overdrive gear O1, starting from the second clutch K2, the gear wheel steps i_5, i_2, and i_4 are used.

Independent of the respective embodiment, if the low speed gear C1 and/or the overdrive gear O1 are not used, disconnection of the output gear wheel 12 from the countershaft w_v1 is not required, and therefore, the coupling device S_ab1 can be omitted for shifting the forward gears G1 to G7, as well as for the shifting of the reverse gear R1, R2, R3. However, when using the low speed gear C1 and/or the overdrive gear O1, the coupling device S_ab1 is required in a way, that the coupling device S_ab1 needs to be partially engaged for shifting the forward gears G1 to G7, as well as for shifting of the reverse gears R1, R2, R3.

Independent of the respective embodiment, in the first forward gear G1 and in the highest forward gear G7, and at least for one reverse gear, both partial transmissions are use, since they are winding-path gears. The first forward gear G1 is also power shiftable. In addition, the gear wheel steps i_4 and i_6, of the power shiftable forward gears G4 and G6, are located together in the second dual gear wheel plane 6-9. In addition, the gear wheel steps i_3 and i_5 of the power shiftable forward gears G3 and G5 are located together in the first dual gear wheel plane 5-8. Also, the gear wheel steps i_2 and i_R are located together in the third dual gear wheel plane 7-10.

Summarizing the first embodiment, in accordance with FIG. 1, it can be seen that, in the first dual gear wheel plane 5-8, the idler gear wheel 5 is used for four forward gears G5, G7, C1, O1, and for a reverse gear R2, and the idler gear wheel 8 is used for four forward gears G1, G3, G7, C1 and for one reverse gear R3. In the second dual gear wheel plane 6-9, the idler gear wheel 6 can be used for a forward gear G6 and for a reverse gear R2, and the idler gear wheel 9 can be used for four forward gears G1, G4, G7, O1 and for a reverse gear R3. Finally, in the third dual gear wheel plane 7-10, the idler gear wheel 7 can be used for four forward gears G1, G2, C1, O1, and the idler gear wheel 10 can be used for three forward gears. Due to the multi-use of certain idle gears, less gear wheel planes and therefore less component parts are needed for the same amount of gears, thus resulting in advantageous installation space savings and cost-saving.

In the second embodiment, in accordance with FIG. 4, the idler gear wheel 5, in the first dual gear wheel plane 5-8, can be used for five forward gears G1, G5, G7, C1, O1 and for a reverse gear R2, the idler gear wheel 8 can be used for three forward gears G3, G7, C1 and for a reverse gear R3. In the second dual gear wheel plane 6-9, the idler gear wheel 6 can be used for two forward gears G1, G6 and for a reverse gear R2, and the idler gear wheel 9 can be used for three forward gears G4, G7, O1, and the idler gear wheel 10 can be used for three reverse gears R1, R2, R3. In the second embodiment, and due to the multi-use of certain idle gears, less gear wheel planes and therefore less parts are needed, but having the same amount of gears, resulting in an advantageous installation space saving and cost-saving.

Independent from the respective embodiment, the numeral "1" in a box of the respective table of the shift schemes, in accordance with FIGS. 2 and 4, means that the associated clutch K1, K2, or the associated coupling devices A, B, C, D, E, F or the associated shifting devices K, I are engaged. In contrast, an empty box in the respective table of the shift schemes, in accordance with FIGS. 2 and 4, means that the associated clutch K1, K2, or the associated coupling device A, B, C, D, E, F or the associated shifting device K, I are each disengaged.

Deviating from the previously mentioned rules, it applies for the coupling device S_ab1, assigned to a drive gear wheel 12 that the coupling device S_ab1, in case of an empty box in the associated table of the shift schemes, in accordance with FIGS. 2 and 4, must be disengaged but that, a box having the numeral "1", depending on the gear in a first group of gears, the coupling device S_ab1 must be engaged, and in a second group of gears, the coupling device S_ab1 can be both disengaged or also engaged. In addition, there is the possibility in many cases to add additional coupling devices or shifting devices, without affecting the flow of force. A gear pre-selection is hereby enabled.

REFERENCE CHARACTERS

1 Fixed Wheel on the second transmission input shaft
2 Fixed Wheel on the first transmission input shaft
3 Fixed Wheel on the first transmission input shaft
5 Idler gear wheel on the first countershaft
6 Idler gear wheel on the first countershaft
7 Idler gear wheel on the first countershaft
8 Idler gear wheel on the second countershaft
9 Idler gear wheel on the second countershaft
10 Idler gear wheel on the second countershaft
K1 first clutch
K2 second clutch
w_an Drive Shaft
w_ab Output Shaft
w_v1 first Countershaft
w_v2 second Countershaft
A Coupling Device
B Coupling Device
C Coupling Device
D Coupling Device
E Coupling Device
F Coupling Device
i_1 Gear Wheel Step, first forward gear
i_2 Gear Wheel Step, second forward gear
i_3 Gear Wheel Step, third forward gear
i_4 Gear Wheel Step, fourth forward gear
i_5 Gear Wheel Step, fifth forward gear
i_6 Gear Wheel Step, sixth forward gear
G1 First forward gear
G2 Second forward gear
G3 Third forward gear
G4 Fourth forward gear
G5 Fifth forward gear
G6 Sixth forward gear
G7 Seventh forward gear
C1 Low Speed Gear
O1 Overdrive Gear
R1 Reverse Gear
R2 Reverse Gear
R3 Reverse Gear
w_zw Intermediate Shaft
ZR Intermediate Gear
11 Fixed gear wheel of the Drive Shaft
12 Drive Gear Wheel of the first Countershaft
13 Drive Gear Wheel of the second Countershaft
14 Torsion Vibration Damper
ZS Gear Wheel Step in use
K Shifting device
I Shifting device
S_ab1 Coupling Device, optional

The invention claimed is:

1. A dual clutch transmission comprising:
first and second clutches (K1, K2) each having an input side connected to a drive input shaft (w_an) and an output side respectively connected to one of first and second transmission input shafts (w_K1, w_K2) arranged coaxially with one another;
at least first and second countershafts (w_v1, w_v2) rotatably supporting idler gear wheels (5, 6, 7, 8, 9, 10);
at least one fixed gear wheel (1, 2, 3) being connected, in a rotationally fixed manner, on each of the first and the second transmission input shafts (w_K1, w_K2) and engaging at least some of the idler gear wheels (5, 6, 7, 8, 9, 10);
a plurality of coupling devices (A, B, C, D, E, F) being supported on the first and the second countershafts (w_v1, w_v2), and each of the plurality of coupling devices (A, B, C, D, E, F) coupling an idler gear wheel (5, 6, 7, 8, 9, 10), in a rotationally fixed manner, to one of the first and the second countershafts (w_v1, w_v2);
output gear wheels (12, 13) each engaging gearing of an output shaft (w_ab) such that several power shiftable forward gears (1, 2, 3, 4, 5, 6, 7) and at least one reverse gear (R1, R2, R3) are shiftable;
first, second and third dual gear planes (5-8, 6-9, 7-10) each comprising an idler gear wheel (5, 8, 6, 9, 7, 10) supported on the first countershaft (w_v1, w_v2), an idler gear wheel (5, 8, 6, 9, 7, 10) supported on the second countershaft (w_v2), and a fixed gear wheel (1, 2, 3) supported on one of the first and the second transmission input shafts (w_K1, w_K2), at least one of the idler gear wheels (5, 6, 7, 8, 9, 10) of each of the first, the second and the third dual gear planes (5-8, 6-9, 7-10) is used for implementing at least two gears, and at least one winding-path gear is shiftable via a shifting device (K, I).

2. The double clutch transmission according to claim 1, wherein an idler gear wheel (8) of a second partial transmission is connected, via a first shifting device (K) on the second countershaft (w_v2), to an idler gear wheel (9) of a first partial transmission such that, via the first shifting device (K), a first forward gear (G1) is shifted as a first one of the at least one winding-path gear, a seventh forward gear (G7) is shifted as a second one of the at least one winding-path gear and a reverse gear (R3) is shifted as a third one of the at least one winding-path gear.

3. The double clutch transmission according to claim 1, wherein an idler gear wheel (8) of a second partial transmission is connected, via a first shifting device (K) on the second countershaft (w_v2), to an idler gear wheel (9) of a first partial transmission such that, via the first shifting device (K), a seventh forward gear (G7) is shifted as a first one of the at least one winding-path gear and a reverse gear (R3) is shifted as a second one of the at least one winding-path gear.

4. The double clutch transmission according to claim 3, wherein an idler gear wheel (5) of the second partial transmission is connected, via a second shifting device (I) on the first countershaft (w_v1), to an idler gear wheel (6) of the first partial transmission such that, via the second shifting device (I), a first forward gear (G1) is shifted as a third one of the at least one winding-path gear and a reverse gear (R2) is shifted as a fourth of the at least one winding-path gear.

5. The double clutch transmission according to claim 1, wherein the first dual gear plane (5-8) comprises a gear wheel (1) on the second transmission input shaft (w_K2) of a second partial transmission, and the second and the third dual gear planes (6-9, 7-10) comprise two fixed gear wheels (2, 3) on the first transmission input shaft (w_K1) of a first partial transmission.

6. The double clutch transmission according to claim 1, wherein
- a first forward gear (G1) is engaged as a first one of the at least one winding-path gear by engagement of the second clutch (K2), a first shifting device (K) and a second coupling device (C);
- a second forward gear (G2) is engaged by engagement of the first clutch (K1) and the second coupling device (C);
- a third forward gear (G3) is engaged by engagement of the second clutch (K2) and a third coupling device (D);
- a fourth forward gear (G4) is engaged by engagement of the first clutch (K1) and a fourth coupling device (E);
- a fifth forward gear (G5) is engaged by engagement of the second clutch (K2) and a first coupling device (A);
- a sixth forward gear (G6) is engaged as a second one of the at least one winding-path gear by engagement of the first clutch (K1), the first shifting device (K), and the first coupling device (A).

7. The double clutch transmission according to claim 6, wherein a first reverse gear (R1) is engaged by engagement of the first clutch (K1) and a fifth coupling device (F), and another reverse gear (R3) is engaged a third one of the at least one winding-path gear by engagement of the second clutch (K2), the first shifting device (K) and the fifth coupling device (F).

8. The double clutch transmission according to claim 7, wherein an additional reverse gear (R2) is engaged as a fourth one of the at least one winding-path gear by engagement of the second clutch (K2), a second shifting device (I) and the fifth coupling device (F).

9. The double clutch transmission according to claim 1, wherein
- a first forward gear (G1) is engaged as a first one of the at least one winding-path gear by engagement of the second clutch (K2), a first shifting device (I) and a third coupling device (C);
- a second forward gear (G2) is engaged by engagement of the first clutch (K1) and the third coupling device (C);
- a third forward gear (G3) is engaged by engagement of the second clutch (K2) and a fourth coupling device (D);
- a fourth forward gear (G4) is engaged by engagement of the first clutch (K1) and a fifth coupling device (E);
- a fifth forward gear (G5) is engaged by engagement of the second clutch (K2) and a first coupling device (A);
- a sixth forward gear (G6) is engaged by engagement of the first clutch (K1) and a second coupling device (B); and
- a seventh forward gear (G7) is engaged as a second one of the at least one winding-path gear by engagement of the first clutch (K1), a second shifting device (K) and the first coupling device (A).

10. The double clutch transmission according to claim 9, wherein a reverse gear (R1) is engaged by engagement of the first clutch (K1) and a sixth coupling device (F), a second reverse gear (R2) is engaged as a third one of the at least one winding-path gear by engagement of the second clutch (K2), the first shifting device (I) and the sixth coupling device (F), and a third reverse gear (R3) is engaged as a fourth one of the at least one winding-path gear by engagement of the second clutch (K2), the second shifting device (K) and the sixth coupling device (F).

11. The double clutch transmission according to claim 1, wherein a low speed gear (C1) is engaged as the at least one winding-path gear by engagement of the first clutch (K1), a second coupling device (C), a first coupling device (A), and a third coupling device (D) and disengagement of an additional coupling device (S_ab1) assigned to a first output gear wheel (12).

12. The double clutch transmission according to claim 11, wherein the low speed gear (C1) is engaged by disengagement of the additional coupling device (S_ab1) assigned to the first output gear wheel (12) to de-couple the first output gear wheel (12) from the first countershaft (w_v1).

13. The double clutch transmission according to claim 1, wherein an overdrive gear (O1) is engaged as the at least one winding-path gear by engagement of the second clutch (K2), a first coupling device (A), a second coupling device (C), and a third coupling device (E), and disengagement of an additional coupling device (S_ab1) assigned to a first output gear wheel (12).

14. The double clutch transmission according to claim 13, wherein the overdrive gear (O1) is engaged by disengagement of the additional coupling device (S_ab1) to de-couple the first output gear wheel (12) from the first countershaft (w_v1).

* * * * *